Aug. 12, 1952　　　W. F. RIDENOUR　　　2,606,681
MACHINE FOR APPLYING ADDRESS LABELS
Filed April 25, 1949　　　　　　　　　　　　　7 Sheets-Sheet 5
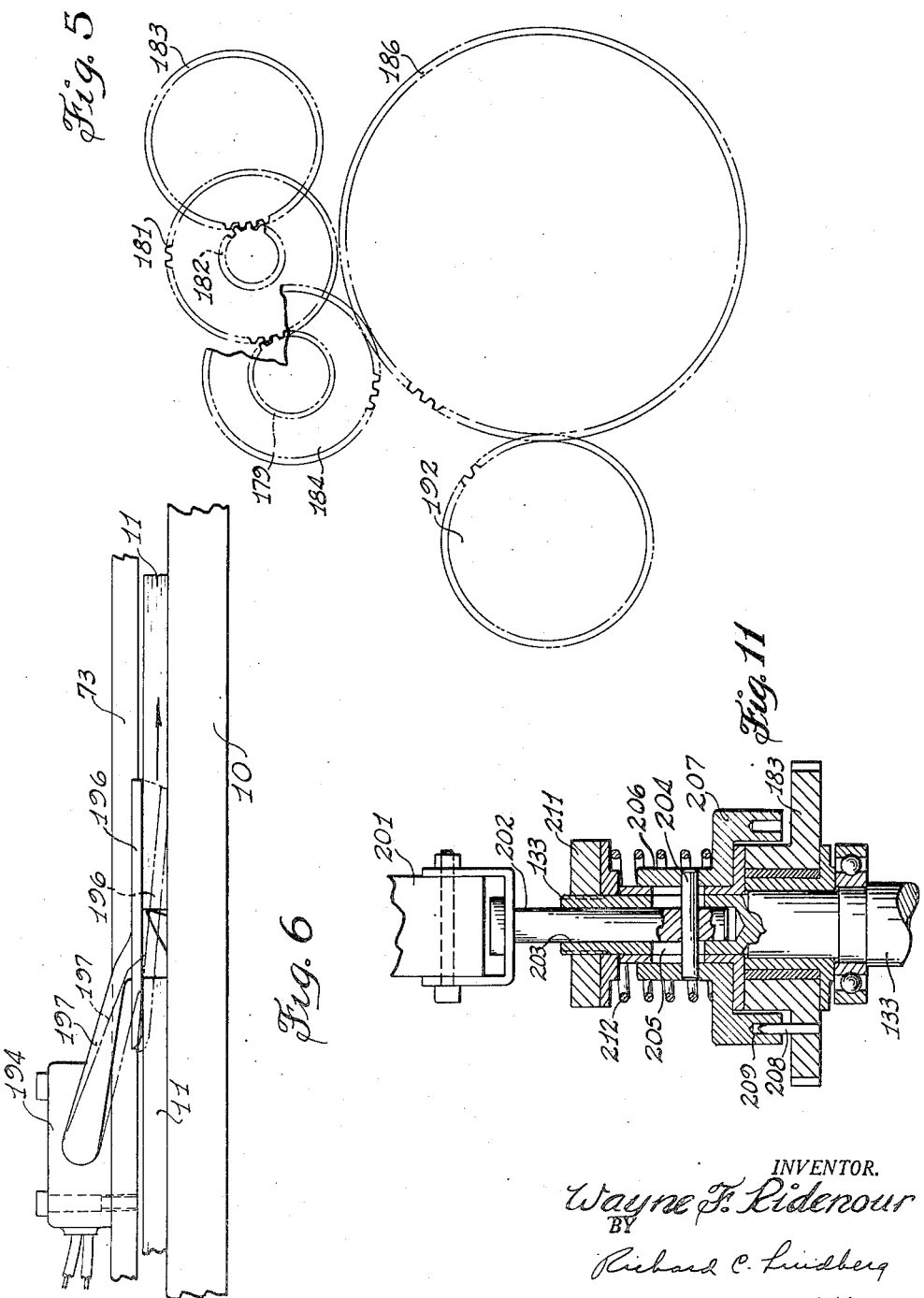
INVENTOR.
Wayne F. Ridenour
BY Richard C. Lindberg
Atty.

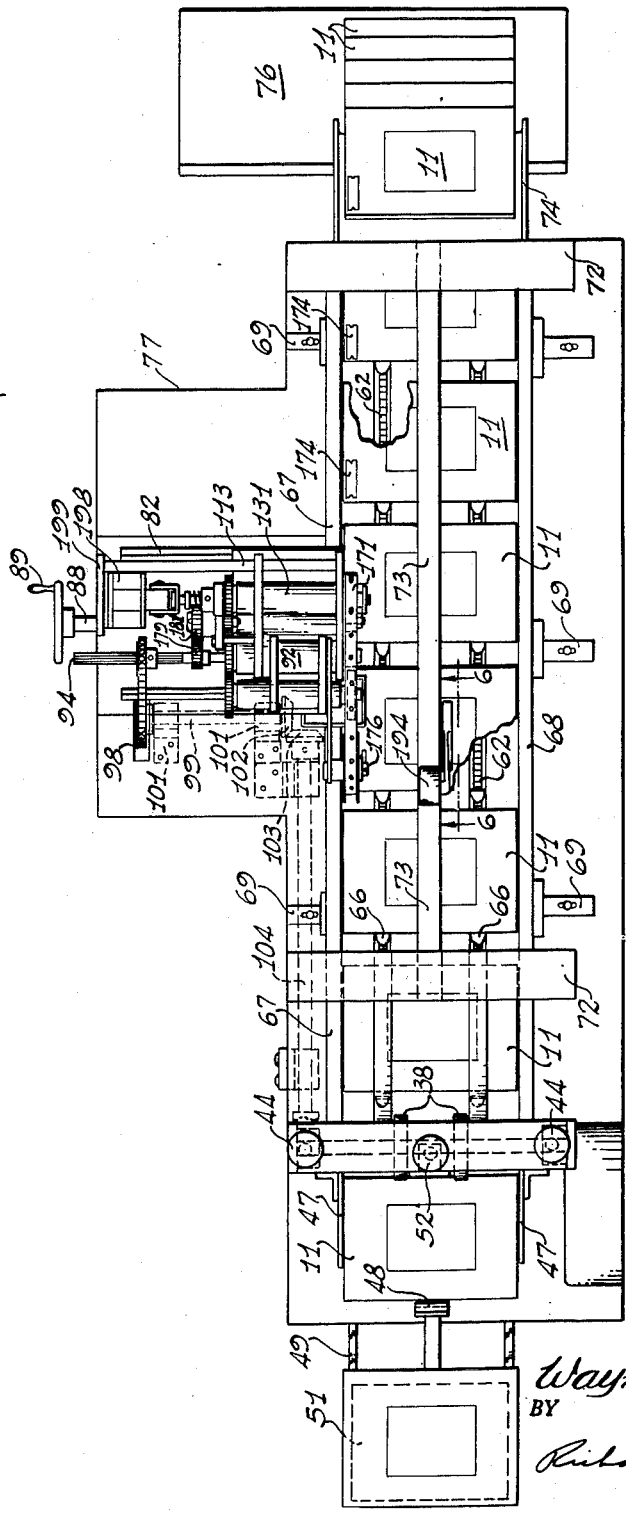

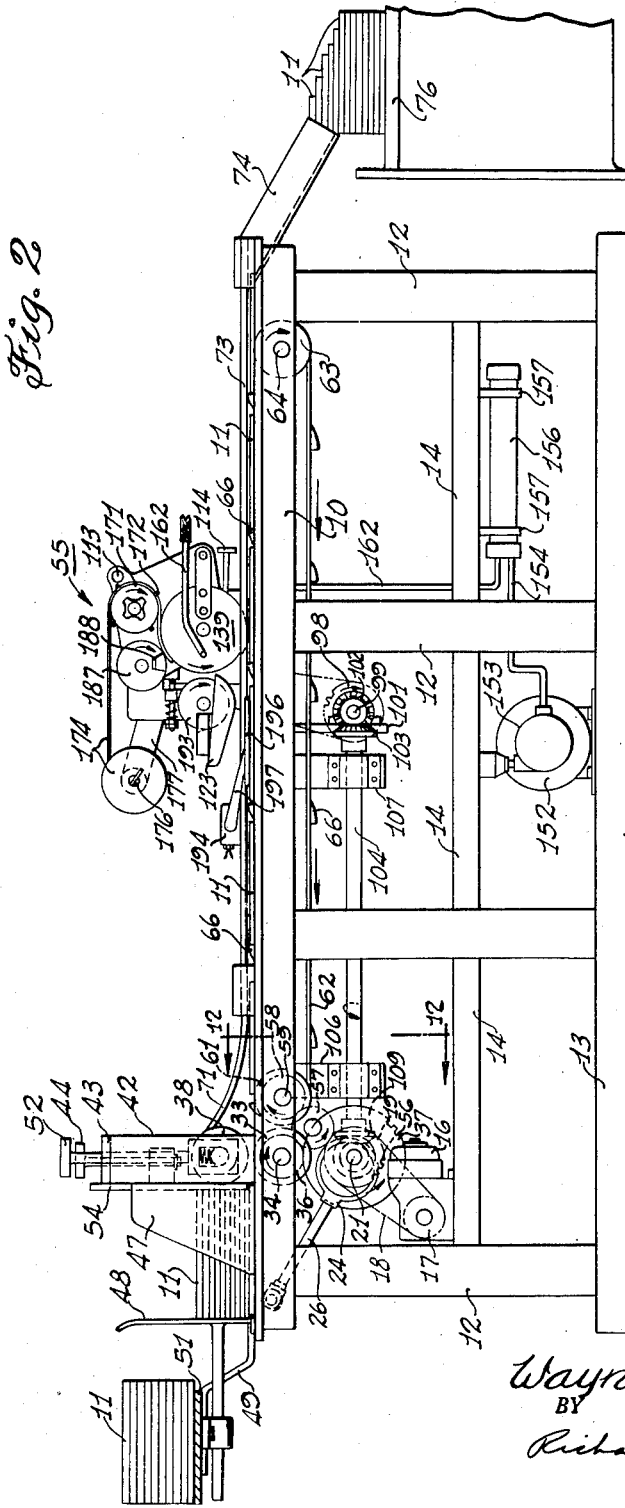

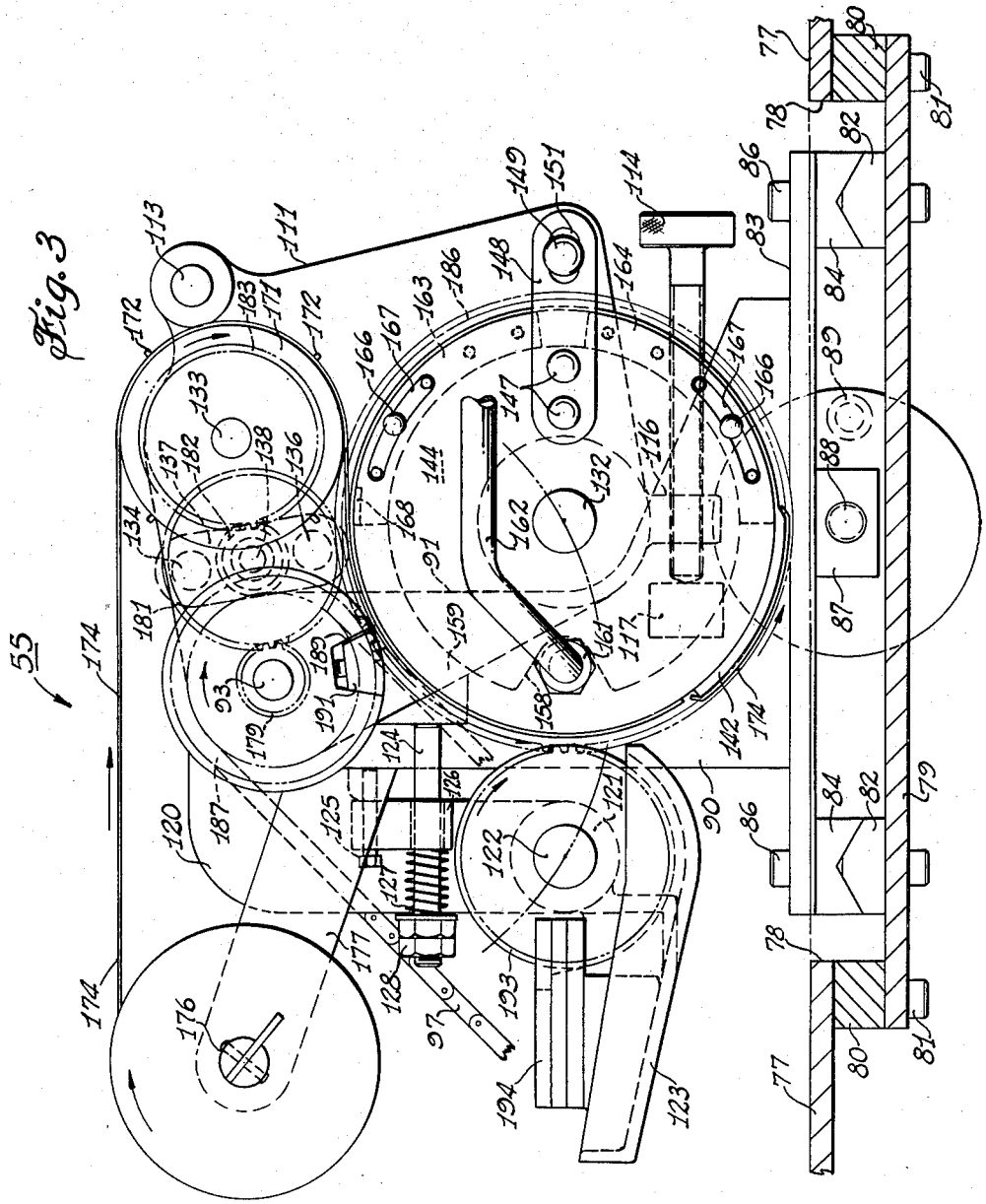

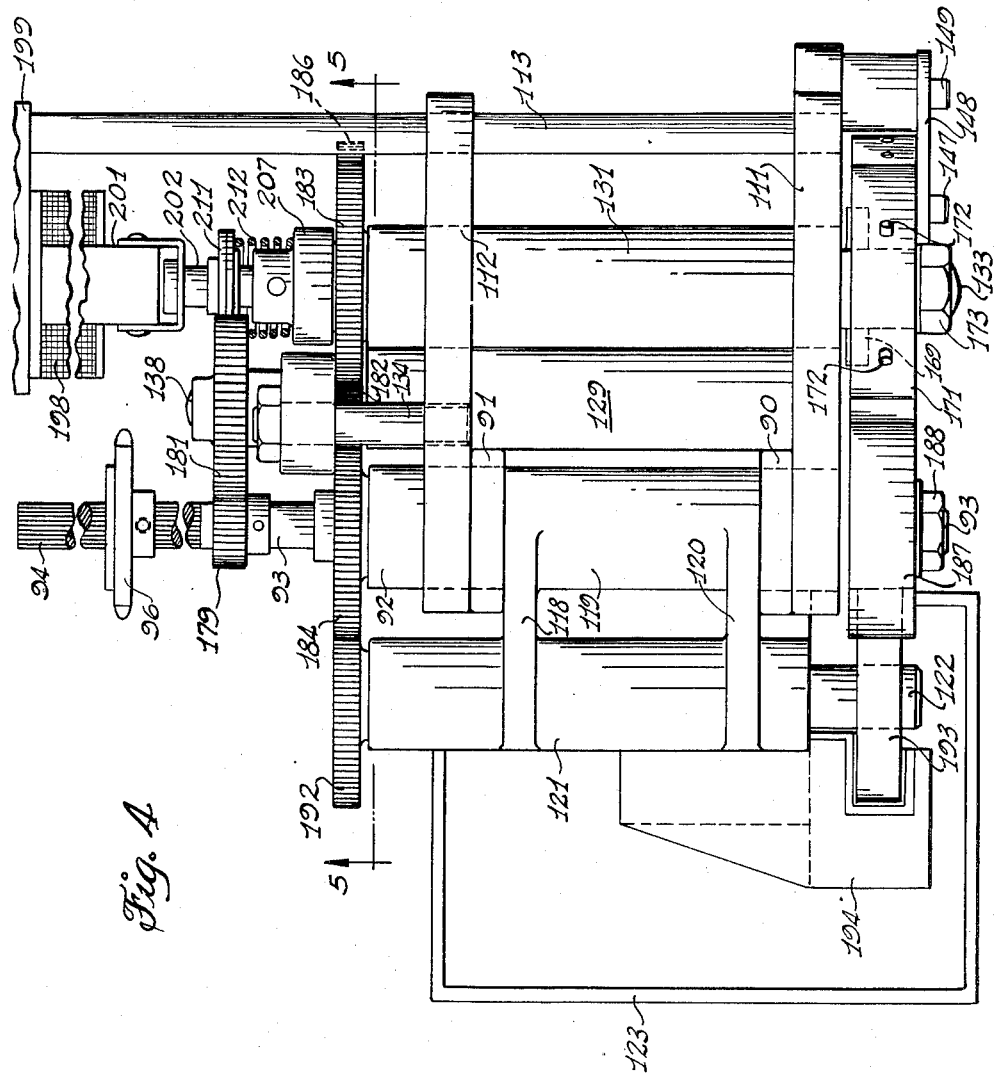

Aug. 12, 1952  W. F. RIDENOUR  2,606,681
MACHINE FOR APPLYING ADDRESS LABELS
Filed April 25, 1949  7 Sheets-Sheet 6
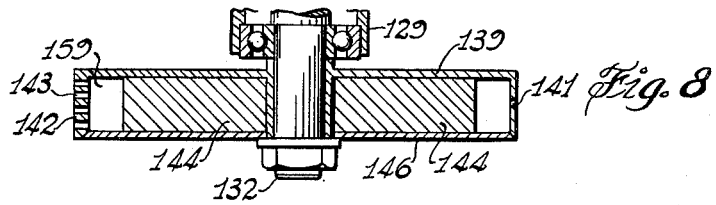
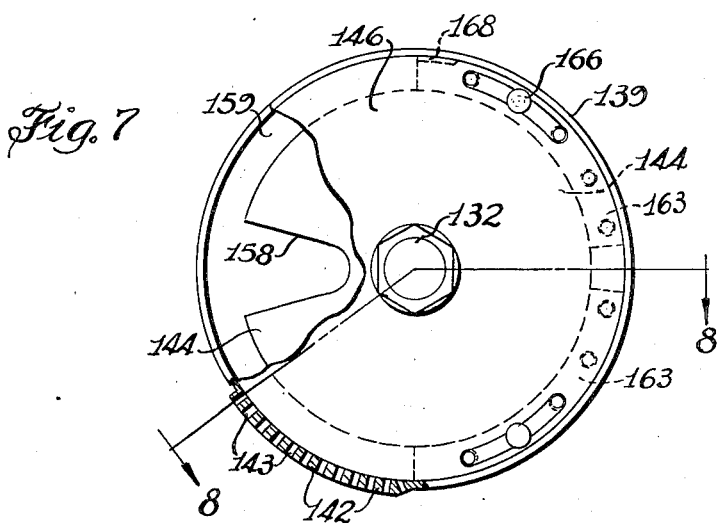
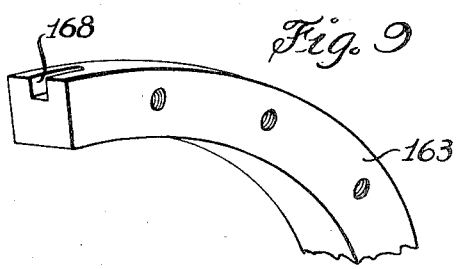
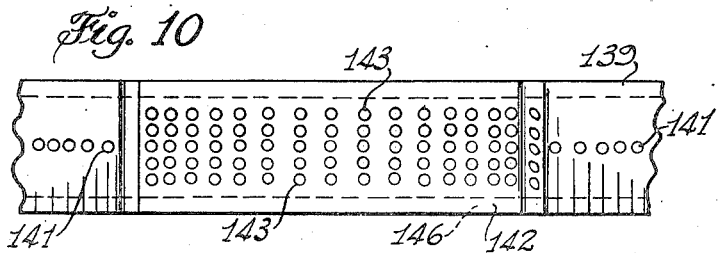
INVENTOR.
Wayne F. Ridenour
BY
Richard C. Lindberg
Atty.

Aug. 12, 1952 W. F. RIDENOUR 2,606,681
MACHINE FOR APPLYING ADDRESS LABELS
Filed April 25, 1949 7 Sheets-Sheet 7
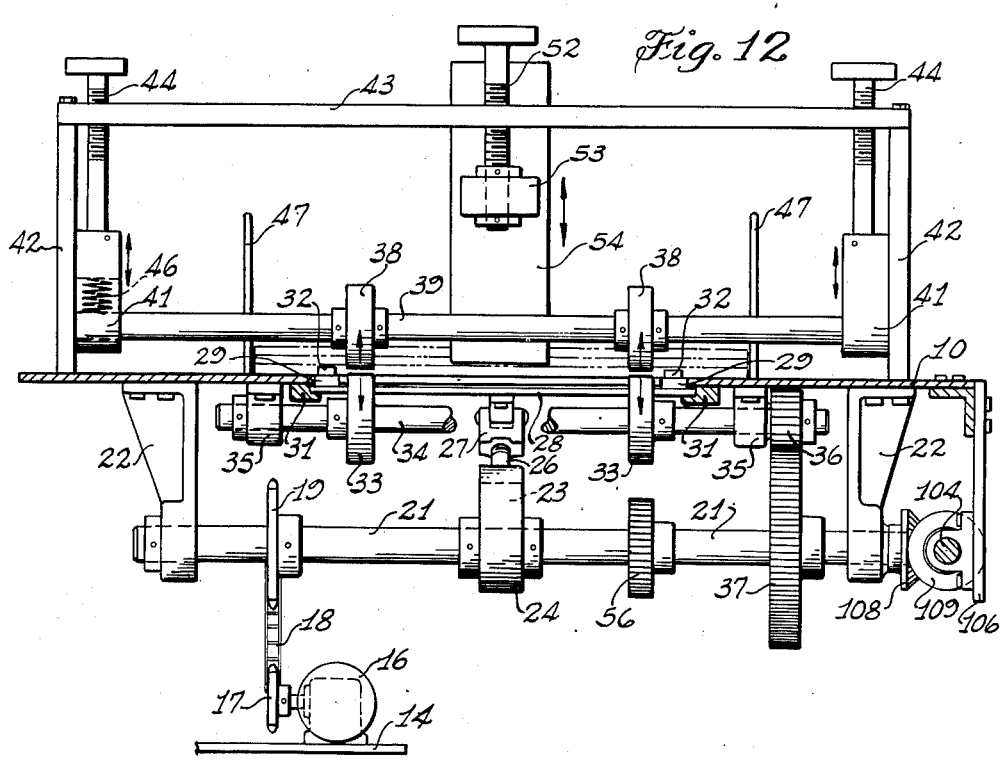
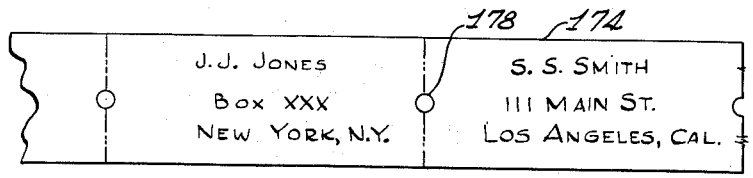
INVENTOR.
Wayne F. Ridenour
BY
Richard C. Lindberg
Atty.

Patented Aug. 12, 1952

2,606,681

UNITED STATES PATENT OFFICE 2,606,681

MACHINE FOR APPLYING ADDRESS LABELS

Wayne F. Ridenour, Oak Park, Ill., assignor to Chesire Mailing Machines, Inc., Chicago, Ill., a corporation of Illinois Application April 25, 1949, Serial No. 89,517

20 Claims. (Cl. 216—28)

This invention relates generally to improvements in mailing machines, and relates particularly to improvements in adressed label applying heads for mailing machines.

In the mailing of mass circulated periodicals it has been the practice to employ coiled strips having subscribers names and addresses intervally spaced thereon, each name and address being separated by a perforation, the so perforated strips being acted upon by a mailing head which intervally feeds the strip, applies paste to the reverse side thereof, severs the strip and applies the severed strip to the magazine or paper.

Heretofore in such addressing or mailing machins it has been the practice to move the mailing pieces individually by means of a conveyor, the movement of the mailing piece being momentarily halted while the severed and pasted label is applied thereto, a second conveyor then removing the mailing piece from proximity to the mailing head for action thereby upon a subsequent periodical or mail piece.

With the foregoing considerations in mind it is a principal object of the invention to enable mail pieces to have mailing address strips applied thereto without the necessity for stopping each mailing piece for the application thereto of an address strip, the address strip being applied to the mailing piece while same is in motion.

Another object is to feed a perforated and severed address strip for application to a moving mailing piece, a length of unsevered strip being held to an applying roller by suction while the roller is applying a perforated and severed strip portion, the length of unsevered strip being advanced with the applying roller by suction applied thereto along the periphery thereof, and thereafter being severed while held along the periphery of the roller for subsequent application of paste thereto prior to being applied to a moving mailing piece.

Still another object comprehends the provision of a mailing head for a mailing machine for enabling a perforated and severed address strip to be applied to a moving mail piece, the address strip being fed along the periphery of any applying roller by suction means, and then being subsequently severed and subjected to a paste applying operation while being held by suction, and thereafter being applied to a moving mailing piece by the applying roller, the suction at such time of application being removed so that the moving mailing piece will withdraw the address strip from the applying roller.

Other objects and important features of the invention will be apparent from a study of the following description taken together with the drawings which illustrate a preferred embodiment of the invention, and what is now considered to be the best mode of applying the principles thereof. While the invention is described in terms of an embodiment which it may assume in practice, it is not intended to be limited in terms of the embodiment shown, nor otherwise than by the terms of the appended claims.

In the drawings:

Fig. 1 is a general plan view of a mailing or addressing machine according to the present invention;

Fig. 2 is a front elevation view thereof;

Fig. 3 is an enlarged view of a mailing head employed in the mailing machine of Figs. 1 and 2;

Fig. 4 is a plan view of the mailing head shown in Fig. 3;

Fig. 5 is a schematic view looking in the direction of the arrows 5—5 of Fig. 4 showing the arrangement of a gear train for operating the mailing head of Fig. 4;

Fig. 6 is an enlarged front elevation view of an electrical throwout mechanism for the mailing head of Figs. 4 and 5;

Fig. 7 is a detailed front elevational view of the label applying roller of Figs. 3 and 4, showing details of the suction means for advancing and holding the address strip;

Fig. 8 is a section through the label applying roller of Fig. 7 taken along the line 8—8 of Fig. 7;

Fig. 9 is a fragmentary isometric view of an adjusting member for adjusting the amount of suction against the periphery of the label applying roller of Figs. 7 and 8;

Fig. 10 is a fragmentary side view of the label applying roller of Fig. 7 looking in the direction of the arrows 10—10 of Fig. 7 at a raised label holding portion thereof and showing details of the suction surface;

Fig. 11 is a partly plan and partly sectional view of a solenoid throwout cooperating with the electrical throwout mechanism of Fig. 6;

Fig. 12 is an enlarged view of the feeding mechanism of the mailing machine shown in Figs. 1 and 2 looking from the right to the left as seen in Figs. 1 and 2; and Fig. 13 is a portion of a mailing or address strip adapted to be acted upon the mailing machine according to the present invention.

Referring now particularly to Figs. 1 and 2 of the drawings, the improved mailing machine and improved mailing head according to the present invention includes a horizontal bed 10 across which mailing pieces 11 are moved at regularly spaced intervals for the application thereto of a perforated and severed label having intelligence thereon. The horizontal bed 10 is supported on vertical legs 12 which in turn rest on a base structure 13, stiffening members 14 being provided which span the distance between the vertical legs 12.

A motor and speed reducer 16 which is supported upon one of the stiffener members 14 is provided with a drive sprocket 17 around which is trained a driving chain 18 for driving a sprocket 19 fast upon a main drive shaft 21 journalled in shaft hangers 22 depending from the bed 10, see Fig. 12. The main drive shaft 21 is provided with an eccentric 23 which cooperates with an eccentric yoke 24 and arm 26 articulately connected at 27 to a shuttle plate 28 adapted to move with reciprocating motion in a longitudinal opening 29, 29 formed in the bed 10. The shuttle plate 28 is adapted to be supported by angle members 31, 31 secured in any convenient manner to the under side of the bed 10. The extreme left end of the shuttle plate 28 as seen in Figs. 1, 2 and 12 is provided with a pair of upstanding lugs 32, 32 of a height slightly less than the magazine or other mailing piece 11, and adapted to move each magazine 11 a short distance by the reciprocatory motion of the shuttle plate 28 and the upstanding lugs 32.

Each mailing piece 11, which has been advanced by the lugs 32 is adapted to be engaged by feed rollers 33 mounted on a shaft 34 journalled in bearings 35 and driven by a pair of gears 36, 37, gear 36 being fast to the shaft 34, and gear 37 being fast to the shaft 21. The feed rollers 33, 33 are adapted to cooperate with matching feed rollers 38 secured to a shaft 39, the ends of which are held in floating journals 41 which are movably supported on standards 42 resting upon the flat bed 10. The vertical supports 42 are spanned by a member 43 which is tapped near each end to receive adjusting screws 44 for moving the journals 41 up and down and for exerting pressure upon springs 46 associated with each journal 41 to regulate the amount of pressure between the rollers 33 and 38 for feeding a mailing piece 11 which has been advanced by the shuttle table 28. The mailing pieces or magazines 11 are held in position on the shuttle table 28 by means of a pair of laterally spaced vertical guides 47 affixed to the bed 10, and an end guide 48 also affixed to the bed 10, the guides 47 and 48 being adjustable in any convenient manner according to the size of the magazines 11. As seen in Figs. 1 and 2, the bed 10 has extending therefrom a bracket 49 and storage shelf 51 to hold a supply of magazines 11 prior to placing them in the hopper formed between the vertical guides 47 and 48.

Means are provided for insuring that one magazine or mailing piece 11 is fed at a time to the feed rollers 33 and 38. To this end the member 43 is tapped to receive an adjusting screw 52 which cooperates with a nut 53 and a gate 54 whereby the gate 54 may be raised or lowered according to the thickness of the magazine 11.

Means are provided for moving the magazines 11 longitudinally of the bed 10 for the application to said magazines of a perforated and severed label applied to each magazine 11 by a mailing head indicated generally at 55. To this end the main drive shaft 21, see also Fig. 12, has fast thereto a gear 56 which meshes with an idler gear 57 journalled, by means not shown, to the underside of the bed 10. The idler gear 57 meshes with a gear 58 fast on a shaft 59, which is conveniently journalled at each end to the bed 10. A pair of sprockets 61 are mounted on the shaft 59 and drive a pair of sprocket chains 62 which are trained around a pair of sprockets 63 mounted on a shaft 64 journalled at the other end of the bed 10. The sprocket chain 62 carry lugs 66 which are adapted to engage each magazine 11 after being fed between the feed rollers 33 and 38. The magazines 11 are guided in their movement over the length of the bed 10 by means of a laterally adjustable guide 67 and a laterally adjustable guide 68 which are held to the bed 10 and adjusted in lateral position by adjusting brackets 69. The magazines 11 are also adapted to be fed only while lying flat by means of a curved hold-down member 71 and a pair of bridging members 72 spanning the bed 10 laterally. A longitudinally extending guide 73 is supported by the bridging member 72 which prevents the magazines 11 from arching while being transported longitudinally of the bed 10.

The magazines which have been transported longitudinally of the bed 10 are adapted to slide down a discharge chute 74 on to a receiving table 76. If desired, the magazines which have been transported by the chains 62 and the lugs 66 may be moved down the discharge chute 74 onto a conveyor belt or any other means for conveying the mailing pieces from the addressing machine.

Referring now particularly to Figs. 2, 3, and 4 of the drawings, means are provided as indicated generally by the numeral 55, for applying a perforated and severed mailing strip containing intelligence thereon to each of the magazines 11. To this end the bed 10 is provided with a lateral extension 77 which is discontinuous at 78, a support plate 79 spanning the discontinuous portion 78 of the lateral extension 77. The support plate 79 is held to the lateral extension 77 by means of laterally extending spacer members 80 and cap screws 81, see Fig. 3. A pair of spaced rails 82 are secured to the support plate 79, and a base plate 83 for the mailing head 55 is adapted to ride on the spaced rails 82 by means of riders 84 held to the base plate 83 by cap screws 86.

Means are provided for adjusting the lateral position of the mailing head 55 with respect to the mailing pieces 11 which are moved longitudinally of the bed 10 by the conveyor chain 62 and lugs 66, in order to provide for positioning a severed and perforated strip as desired on each mailing piece 11. As shown particularly with reference to Figs. 1 and 3, the base plate 83 is provided with a nut 87 which cooperates with a worm 88 and a turning handle 89, the worm 88 also cooperating with a similar nut, not shown, secured to the support plate 79, so that upon rotation of the turning handle 89, the labeling head 55 may be moved laterally of the bed 10.

The mailing head 55 includes a pair of substantially L-shaped brackets 90 and 91, see also Fig. 4, which extend from the base plate 83, and which are reamed to receive a sleeve 92. The sleeve 92 provides a journal for a shaft 93 which is splined at 94 to provide end-wise motion of the mailing head 55 along the rails 82 with respect to a driving sprocket 96. The sprocket 96 is adapted to be driven by a sprocket chain 97 which is trained around a sprocket 98 fast on a shaft 99 journalled on a shaft hanger 101 depending from the underside of the bed 10. The shaft 99 has fast thereto a miter gear 102 which cooperates with a mating miter gear 103 fast on a shaft 104 journalled in shaft hangers 106 and 107 depending from the bed 10. The shaft 104 is driven from a miter gear 108, see Fig. 12, secured to the end of the shaft 21, and which mates with a miter gear 109 at the end of the shaft 104.

The sleeve 92 which is journalled in the fixed brackets 91 supports a front frame 111, see Figs. 3 and 4, and a rear frame 112 which are connected together by a stud 113 extending laterally of the bed 10, and which are adapted to be adjusted together rotatively by means of an adjusting screw 114 which is threaded into a lug 116 extending downward from the front frame 111. The adjusting screw 114 abuts a stop 117 struck out from the fixed bracket 90.

The sleeve 92 also supports a pair of arms 118 and 120 which are formed integrally with a hub 119. The arms 118 and 120 extend downwardly as seen in Fig. 3 and are formed integrally with a hollow sleeve 121 which forms a journal for a shaft 122. A trough 123 is formed integrally at the end of the arms 118 and 120 to provide a receptacle for paste or other suitable liquid adhesive.

The arms 118 and 120 are adapted to be adjusted with respect to the front frame 111 by means of a stud 124 tapped into the front frame 111. The stud 124 extends through an ear 126 formed on the arm 120, the arms 118 and 120 being urged together toward the front frame 111 by means of a coil spring 127 surrounding the stud 124, the amount of pressure of such spring 127 being adjusted by nuts 128 threaded to the end of the stud 124, the spring 127 thus being held between the nuts 128 and the ear 126. In order to limit the movement of the arm 120 toward the front frame 111 the ear 126 is also tapped to receive a stop screw 125 which abuts the front frame 111.

The front frame 111 and the rear frame 112 are reamed to receive sleeves 129 and 131 which forms journals respectively for shafts 132 and 133, see also Fig. 11. The rear frame 112 is tapped to receive a pair of studs 134 and 136 which support a bracket 137 for a shaft 138 which freely turns therein.

Referring now particularly to Figs. 3, 4, 7, and 8 of the drawings, the shaft 132 has fast thereto a cup shaped label applying roller 139, the periphery of which is provided with suction openings 141. The periphery of the roller 139 is also provided with a raised pad portion 142 which is provided with closely spaced suction openings 143, see also Fig. 10. The shaft 132 and the roller 139 are adapted to rotate about a fixed filler block 144 and a closure plate 146 which are held against rotation by cap screws 147 tapped thereinto and bearing against an arm 148 supported by the front frame member 111 by a cap bolt 149, the cap bolt 149 passing through an elongated slot 151 of the bracket 149.

Means are provided for subjecting the suction openings 141 and 143 to a source of vacuum pressure. As seen with particular reference to Fig. 2, the base structure 13 supports a motor 152 and a vacuum pump 153 connected by a line 154 to a vacuum storage chamber 156 supported by hangers 157 to the stiffening member 14. The stationary filler block 144 is provided with a recess 158 which is continuous with a chamber 159 formed between the periphery of the stationary filler block 144 and the inner periphery of the roller 139. A fitting 161 is tapped into the closure 146 for a vacuum pressure line 162 which is connected to the vacuum storage chamber 156. The length of the vacuum chamber 159 is enabled to be adjusted by arcuate segments 163 and 164 which are of such dimension as to fit between the periphery of the filler block 144 and the inner periphery of the roller 139, the position of the arcuate segments 163 and 164 being adjusted by cap screws 166 which pass through arcuate openings 167 formed in the closure 146. As seen in Fig. 9, the arcuate segment 163 is provided with a slot 168 which forms a continuation of the chamber 159 and which is in register with the openings 141 in the periphery of the roller 139, to provide a certain amount of metering action of the suction applied to the periphery of the roller 139 where the roller commences to be in register with the suction chamber 159.

Means are provided for feeding a perforated mailing strip having intelligence thereon to the periphery of the label applying roller 139. As shown in Figs. 3 and 4 particularly, the shaft 133 which is journalled in the sleeve 131 has keyed thereto a flange 169. A feed roller 171 having perforation engaging pins 172 extending from the periphery thereof is adapted to abut the keyed flange 169, and to be held for rotation therewith by a nut 173 threaded to the shaft 133 and bearing against the feed roller 171.

As seen in Figs. 2 and 3, a supply roll of an intervally perforated mailing strip 174, see also Fig. 13, having intelligence thereon is supported on a spindle 176 and a bracket 177 extending from the fixed bracket 90. The pins 172 extending from the feed roller 171 are adapted to engage perforations 178 which are intervally spaced throughout the length of the strip 174 and which occupy positions between the intelligence thereon. As seen in Figs. 2 and 3, as the feed roll 171 rotates in a clockwise direction the suction at the openings 141 and 143 will hold the strip 174 to the periphery of the roller 139.

Means are provided for rotating the label applying roller 139 through one revolution for the movement past the mailing head 55 of each mailing piece 11 transported by the lugs 66 and the conveyor chains 62. The periphery of the roller 139 is made equal to the longitudinal distances between adjacent conveyor lugs 66. The feed roller 171 is designed to make a quarter revolution for each full revolution of the label applying roller 139, so that a length of label between adjacent perforations 178 will be advanced along the periphery of the roller 139.

To this end the drive shaft 93 has mounted thereon a pinion 179 which meshes with an idler gear 181 fast to the shaft 138 which is supported in the bracket 137. The shaft 138 also has fast thereto a pinion 182 which meshes with a gear 183 adapted normally to rotate with the shaft 133 to turn the feed roller 171. The ratios selected for the pinion 179, and the idler gears 181 and 182 is such that the pinion 179 makes two revolutions for each one-quarter revolution of the gear 183 and the feed roller 171. A gear 184 is mounted fast to the shaft 93 for driving a gear 186 to rotate the label applying roller 139, as seen best with reference to Fig. 5. The ratio selected for the gear 186 to the gear 184 is such that the label applying roller 139 will rotate at one-half the speed of the shaft 93.

Means are provided for severing a single perforated label from the strip 174 as it has advanced over the periphery of the label applying roller 139 and has been held thereto by the suction at the openings 141 and 143. To this end the shaft 93 is provided with a cutting wheel 187, see particularly Figs. 2 and 3, which is held to the shaft 93 in any convenient manner as indicated as by the nut 188. The cutting wheel 187 is provided with a radial knife 189 which is held in position by a wedge 191, as shown in Fig. 3. The radial knife 189 is provided with a serrated edge to provide a combined shearing and punching action of the strip 174 which is held along the periphery of the label applying roller 139.

As shown with reference to Fig. 3, the label applying roller 139 and the cutting wheel 187 are so adjusted with respect to the feed roll 171 that the strip 174 will have advanced sufficiently so that the free end thereof will be in register with the leading edge of the raised pad 142 as the roller 139 turns in a counter-clockwise direction, a perforation 178 then being in register with the trailing edge of the raised pad 142 and in position to be severed by the knife 189 which will effect the punching and shearing action above described. The knife 189 is adapted to clear the trailing edge of the pad 142 and to rotate after the shearing action to clear an additional length of strip 174 which is being advanced by the feed roller 171.

Means are provided for applying a film of adhesive to the perforated and severed label 174 which is held to the pad 142 as it continues counter-clockwise rotation with the label applying roller 139. As shown with particular reference to Figs. 3 and 4, the shaft 122 journalled in the hollow sleeve 121 is provided with a gear 192 which meshes with the gear 186. The other end of the shaft 122 is provided with a roller 193 which rotates partly submerged beneath the level of liquid adhesive held in the trough 123, a scraper 194 being mounted above the level of the liquid adhesive to scrape off an excess of adhesive from the periphery and sides of the paste roller 193. Preferably, the face width of the paste roller 193 is less than the width of the strip 174 so that liquid adhesive will not be squeezed beyond the edges of the strip 174 in being applied to the mailing pieces 11 as they move beneath the raised pad 142 of the roller 139.

The feed roller 171 is adapted to be stopped in its rotating movement when the lugs 66 fail to engage a mailing piece 11, or when the shuttle table 28 fails to move a mailing piece between the fed rollers 33 and 38, or when the hopper formed by the guides 47 and the guides 48 is not filled with mailing pieces. To this end a switch 194 is mounted on the longitudinally extending guide 73, the switch 194 being provided with a sensing member 196 mounted on the end of an arm 197, see also Fig. 6. If a pair of lugs 66 are not moving a mailing piece 11 the arm 197 will rock to the dotted line position shown in Fig. 6 to close a pair of contacts within the switch 194. The closing of the switch 194, see Figs. 4 and 11, energizes a solenoid 198 mounted on a bracket 199 which is secured to the stud 113. The solenoid 198 is provided with a plunger 201 which is articulately connected as shown to a link 202 adapted to be received within a counterbore 203 formed in the shaft 133. The link 202 is provided with a pin 204 which straddles a hub 206 of a pin clutch 207. The pin 204 is also adapted to straddle and move lengthwise of a slot 205 formed in the shaft 133. The gear 183 which is free to rotate on the shaft 133 drives the feed roller 171 through a connection afforded by a pin 208 adapted to be engaged within a recess 209 formed in the pin clutch 207. The end of the shaft 133 adjacent the solenoid 198 is provided with a stop 211 which forms an abutment for a spring 212, the other end of the spring 212 abutting the pin clutch 207.

It will be seen with reference to Figs. 4 and 6 that when the switch 194 is closed, the solenoid 198 will be energized to pull the plunger 201 and the link 202 against the force of the spring 212 thereby disengaging the connection between the pin 208 and the pin clutch 207, thus permitting the gear 183 to turn freely on the shaft 133 and release the driving connection between the gear 183 and the shaft 133. It will also be seen that the feed roller 171 will thus be stopped in its movement to prevent the feeding of a strip 174 along the periphery of the label applying roller 139 when there is a gap between the ordinarily regularly spaced mailing pieces 11 beneath the mailing head 55 so that a severed and pasted strip will not be carried by the label applying roller 139 for want of a mailing piece for the application thereto of a severed and pasted strip.

Referring back now to Fig. 3 of the drawings, the label applying wheel 139 may be adjusted according to the thickness of the mail pieces 11, by turning the adjusting screw 114 against the stop 117 which will thereby rock the frames 111 and 112 around the sleeve 92. Since the shaft 93 and the gears 179 and 184 mounted thereon provide a common driving center for the idling gears 181 and 182 and the gear 183 driving the feed roller 171, such adjustment can be made without disturbing the relative arrangement of the feed roller 171 and the cutting wheel 187. The shaft 121 which supports the gear 193 meshing with the gear 186 driving the label applying roller 139 will likewise follow the adjustment of the frames 111 and 112 together with the shafts that are journalled thereon, since the brackets 118 and 120 are likewise adapted to rotate about the common center of the sleeve 119. As explained, the amount of engagement of the gear 192 with the gear 186 may be adjusted by the adjusting screw 125 in accordance with the thickness of the label strip 174 and the thickness of the adhesive film applied thereto by the paste roller 193.

In operation, while the mailing pieces 11 have been fed at regular spaced intervals by the shuttle table 28 and the feed rollers 33 and 38 to be carried longitudinally of the bed 10 by the conveyor chains 62 and the lugs 66, the supply of perforated strip 174 is advanced by the feed roller 171 over the periphery of the label applying roller 139. The perforated strip is held by suction to the periphery of the roll 139 and will have been advanced by the drag created by the suction against the strip 174 until the strip will overlie the raised portion 142, the strip then being severed by the blade 189 of the cutting roller 187 along the trailing edge of the raised portion 142. Thereafter the perforated and severed label which is held by the suction at the openings 143 of the raised portion 142 will move past the paste roller 193 for the application thereto of a thin film of liquid adhesive, the perforated and severed label continuing to be held by the raised portions 142 until the glued side comes into contact with a mailing piece 11 moving at regularly spaced intervals. At such time as the perforated and severed label comes into contact with the mailing piece 11 the suction against the openings 143 is cut off, since the openings will then be in register with the left hand end of the arcuate segment 164, constant mechanical pressure being applied by the raised portion 142 as it moves into contact with the mailing piece 11 and with respect thereto.

Each mailing piece which has received a perforated and severed label as shown in Fig. 1 then moves to the end of the bed 10 by means of the conveyor chains 62 and the lugs 66 into the trough 74 and onto the table 76 to be removed as desired.

Meanwhile, the strip 174 is being advanced by the feed roller 171 until another label is in overlying position with respect to the raised portion 142 which will have rotated to the position in Fig. 3 to hold an additional length of strip 174 for severing and subsequent application of paste and subsequent application to a succeeding mailing piece being moved by the conveyor chains 62.

As has been explained, if the mailing pieces 11 are not spaced at regular intervals while being moved along the bed 10, the switch 194 will close and the solenoid 198 will be energized to stop the movement of the feed roller 171 until the mailing pieces are once more regularly spaced.

According to the present invention it is possible to apply labels or address strips to periodicals or other mailing pieces without the necessity of stopping each mailing piece for the application thereto of perforated and severed labels, thus enabling the mailing operation to be accomplished with a great deal more speed than would have been possible heretofore. According to the present invention the mailing head may be readily adjusted in accordance with the thickness of each mailing piece. While the invention has been described in the terms of an embodiment which it may assume in practice, the scope of the invention is not intended to be limited in terms of the embodiment shown nor otherwise than by the claims here appended.

I claim:

1. In a mailing machine of the type wherein mailing pieces are moved at evenly spaced intervals for application thereto of a severed label having intelligence thereon: a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, means for severing said intervally perforated strip when said intervally perforated strip has advanced along the periphery of said label applying roller to be held by suction to said raised portion, a paste applying roller for applying paste to said severed label while being held against said raised portion, and means associated with said label applying roller for breaking the suction at said openings in said raised portion when said label applying roller has rotated to a position where said raised portion is in engagement with a mailing piece with a pasted and severed label therebetween.

2. In a mailing machine of the type wherein mailing pieces are moved at evenly spaced intervals for application thereto of a severed label having intelligence thereon; a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said label applying roller of length substantially equal to the length between perforations of said intervally perforated strip, said raised portion having suction openings in the face thereof for holding a severed label thereto, means for severing said intervally perforated strip when said intervally perforated strip has advanced along the periphery of said label applying roller to be held by suction to said raised portion, a paste applying roller for applying paste to said severed label while being held against said raised portion, means associated with said label applying roller for breaking the suction against said openings in said raised portion when said label applying roller has rotated to a position where said raised portion is in engagement with a mailing piece with a pasted and severed label therebetween, and means for disengaging said feed roller when the distance between said mailing pieces is in excess of a predetermined amount.

3. In a mailing machine of the type wherein mailing pieces are moved at evenly spaced intervals for application thereto of a severed label having intelligence thereon: a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, means for severing said intervally perforated strip when said intervally perforated strip has advanced along the periphery of said label applying roller and is held by suction to said raised portion, means for applying paste to said severed label while being held against said raised portion, means associated with said label applying roller for breaking the suction against said openings in said raised portion when said label applying roller has rotated to a position where said raised portion is in engagement with a mailing piece with a pasted and severed label therebetween, and means for disengaging said feed roller when the distance between said mailing pieces is in excess of a predetermined amount including a sensing finger cooperating with a switch adapted to operate when the interval between said mailing pieces is in excess of a predetermined amount to energize a solenoid for controlling said disengaging means.

4. In a mailing machine of the type wherein mailing pieces are moved at evenly spaced intervals for application thereto of a severed label having intelligence thereon: a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, means for severing said intervally perforated strip when said intervally perforated strip has advanced along the periphery of said label applying roller to be held by suction to said raised portion, a paste applying roller for applying paste to said severed label while being held against said raised portion, means associated with said label applying roller for breaking the suction against said openings in said raised portion when said label applying roller has rotated to a position where said raised portion is in engagement with a mailing piece with a pasted and severed label therebetween, and means for adjusting the height of said label applying roller in accordance with the thickness of said regularly spaced mailing pieces.

5. In a mailing machine of the type wherein mailing pieces are moved at evenly spaced intervals for application thereto of a severed label having intelligence thereon: a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, a shaft driven in accordance with the speed of movement of said regularly spaced mailing pieces, a journal for said shaft, a rotating cutter carried by said shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said shaft, said frame being adjustable in position according to the thickness of said regularly spaced mailing pieces.

6. In a mailing machine of the type wherein mailing pieces are moved at evenly spaced intervals for application thereto of a severed label having intelligence thereon: a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, a shaft driven in accordance with the speed of movement of said regularly spaced mailing pieces, a journal for said shaft, a rotating cutter carried by said shaft for severing said intervally perforated strip when said intervally perforated strip has advanced along the periphery of said label applying roller to be held by suction to said raised portion, a paste applying roller for applying past to said severed label while being held against said raised portion, a frame adapted to be rotated around said journal for supporting said feed roller and said label applying roller in driving engagement with said shaft, said frame being adjustable in position according to the thickness of said regularly spaced mailing pieces, and means associated with said label applying roller for breaking the suction against said openings in said raised portions when said label applying roller has rotated to a position where said raised portion is in engagement with a mailing piece with a pasted and severed label therebetween.

7. In a mailing machine of the type wherein mailing pieces are moved at evenly spaced intervals for application thereto of a severed label having intelligence thereon: a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said label applying roller of length substantially equal to the length between perforations of said intervally perforated strip, said raised portion having suction openings in the face thereof for holding a severed label thereto, a shaft driven in accordance with the speed of movement of said regularly spaced mailing pieces, a journal for said shaft, a rotating cutter carried by said shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said shaft, said frame being adjustable in position according to the thickness of said regularly spaced mailing pieces, and a bracket for supporting said paste applying roller adapted to be adjusted with respect to said frame and said label applying roller in accordance with the thickness of said label and the thickness of paste film to be applied to said label.

8. In a mailing machine of the type wherein mailing pieces are moved at evenly spaced intervals for application thereto of a severed label having intelligence thereon: a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, a shaft driven in accordance with the speed of movement of said regularly spaced mailing pieces, a journal for said shaft, a rotating cutter carried by said shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said shaft, said frame being adjustable in position according to the thickness of said regularly spaced mailing pieces, means associated with said label applying roller for breaking the suction against said openings in said raised portion when said label applying roller has rotated to a position where said raised portion is in engagement with a mailing piece with a pasted and severed label therebetween, and means for disengaging said feed roller when the interval distance between said mailing pieces is in excess of a predetermined amount.

9. In a mailing machine of the type wherein mailing pieces are moved at evenly spaced intervals for application thereto of a severed label having intelligence thereon: a mailing head for applying said severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, a shaft driven in accordance with the speed of movement of said regularly spaced mailing pieces, a journal for said shaft, a rotating cutter carried by said shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said shaft, said frame being adjustable in position according to the thickness of said regularly spaced mailing pieces, means associated with said label applying roller for breaking the suction against said openings in said raised portion when said label applying roller has rotated to a position where said raised portion is in engagement with a mailing piece with a pasted and severed label therebetween, and means for disengaging said feed roller when the interval between said mailing pieces is in excess of a predetermined amount including a sensing finger cooperating with a switch adapted to operate when the interval between said mailing pieces is in excess of a predetermined amount, said switch being adapted to control the energization of a solenoid for controlling said disengaging means.

10. In a mailing machine for applying a severed label to a mailing piece of the type wherein mailing pieces are fed to a pair of feed rollers for movement of an individual mailing piece to a bed having a conveyor thereon with mailing piece engaging members for transport of individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, means for severing said intervally perforated strip when said intervally perforated strip has advanced along the periphery of said label applying roller to be held by suction to said raised portion, a paste applying roller for applying paste to said severed label while being held against said raised portion, and means associated with said label applying roller for breaking the suction against said openings in said raised portion when said label applying roller has rotated to a position where said raised portion is in engagement with a mailing piece with a pasted and severed label therebetween.

11. In a mailing machine for applying a severed label to a mailing piece of the type wherein mailing pieces are fed to a pair of feed rollers for movement of an individual mailing piece to a bed having a conveyor thereon with mailing piece engaging members for transport or individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said label applying roller of length substantially equal to the length between perforations of said intervally perforated strip, said raised portion having suction openings in the face thereof for holding a severed label thereto, means for severing said intervally perforated strip when said intervally perforated strip has advanced along the periphery of said label applying roller to be held by suction to said raised portion, a paste applying roller for applying paste to said severed label while being held against said raised portion, means associated with said label applying roller for breaking the suction against said openings in said raised portion when said label applying roller has rotated to a position where said raised portion is in engagement with a mailing piece with a pasted and severed label therebetween, and means for disengaging said feed roller when the interval between said mailing pieces is in excess of a predetermined amount.

12. In a mailing machine for applying a severed label to a mailing piece of the type wherein mailing pieces are fed to a pair of feed rollers for movement of an individual mailing piece to a bed having a conveyor thereon with mailing piece engaging members for transport of individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, means for severing said intervally perforated strip when said intervally perforated strip has advanced along the periphery of said label applying roller for applying paste to said severed label while being held against said raised portion, means associated with said label applying roller for breaking the suction against said openings in said raised portion when said label applying roller has rotated to a position where said raised portion is in engagement with a mailing piece with a pasted and severed label therebetween, and means for disengaging said feed roller when the interval between said mailing pieces is in excess of a predetermined amount including a sensing finger cooperating with a switch adapted to operate when the interval between said mailing pieces is in excess of a predetermined amount, said switch being adapted to control the deenergization of a solenoid for controlling said disengaging means.

13. In a mailing machine for applying a severed label to a mailing piece of the type wherein mailing pieces are fed to a pair of feed rollers for movement of an individual mailing piece to a bed having a conveyor thereon with mailing piece engaging members for transport of individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, means for severing said intervally perforated strip when said intervally perforated strip has advanced along the periphery of said label applying roller to be held by suction to said raised portion, a paste applying roller for applying paste to said severed label while being held against said raised portion, means associated with said label applying roller for breaking the suction against said openings in said raised portion when said label applying roller has rotated to a position where said raised portion is in engagement with a mailing piece with a pasted and severed label therebetween, and means for adjusting the height of said label applying roller in accordance with the thickness of said regularly spaced mailing pieces.

14. In a mailing machine for applying a severed label to a mailing piece of the type wherein mailing pieces are fed to a pair of feed rollers for movement of an individual mailing piece to a bed having a conveyor thereon with mailing piece engaging members for transport of individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, a shaft driven by said power shaft and in accordance with the speed of movement of said regularly spaced mailing pieces, a journal for said second named shaft, a rotating cutter carried by said second named shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said last-named shaft, said frame being adjustable in position according to the thickness of said regularly spaced mailing pieces.

15. In a mailing machine for applying a severed label to a mailing piece of the type wherein mailing pieces are fed to a pair of feed rollers for movement of an individual mailing piece to a bed having a conveyor thereon with mailing piece engaging members for transport of individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, a shaft driven by said power shaft and in accordance with the speed of movement of said regularly spaced mailing pieces, a journal for the said second named shaft, a rotating cutter carried by said second named shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said second named shaft, said frame being adjustable in position according to the thickness of said regularly spaced mailing pieces, and means associated with said label applying roller for breaking the suction against said openings in said raised portion when said label applying roller has rotated to a position where said raised portion is in engagement with a mailing piece with a pasted and severed label therebetween.

16. In a mailing machine for applying a severed label to a mailing piece of the type wherein mailing pieces are fed to a pair of feed rollers for movement of an individual mailing piece to a bed having a conveyor thereon with mailing piece engaging members for transport of individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said label applying roller of length substantially equal to the length between perforations of said intervally perforated strip, said raised portion having suction openings in the face thereof for holding a severed label thereto, a shaft driven from said power shaft and in accordance with the speed of movement of said regularly spaced mailing pieces, a journal for said second named shaft, a rotating cutter carried by said second named shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said second named shaft, said frame being adjustable in position according to the thickness of said regularly spaced mailing pieces, and a bracket for supporting said paste applying roller adapted to be adjusted with respect to said frame and said label applying roller in accordance with the thickness of said label and the thickness of paste film to be applied to said label.

17. In a mailing machine for applying a severed label to a mailing piece of the type wherein mailing pieces are fed to a pair of feed rollers for movement of an individual mailing piece to a bed having a conveyor thereon with mailing piece engaging members for transport of individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said label applying roller of length substantially equal to the length between perforations of said intervally perforated strip, said raised portion having suction openings in the face thereof for holding a severed label thereto, a shaft driven by said power shaft and in accordance with the speed of movement of said regularly spaced mailing pieces, a journal for said second named shaft, a rotating cutter carried by said second named shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said second named shaft, said frame being adjustable in position according to the thickness of said regularly spaced mailing pieces, means associated with said label applying roller for breaking the suction against the openings in said raised portion when said label applying roller has rotated to a position where said raised portion is in engagement with a mailing piece with a pasted and severed label therebetween, and means for disengaging said feed roller when the interval between said mailing pieces is in excess of a predetermined amount.

18. In a mailing machine for applying a severed label to a mailing piece of the type wherein mailing pieces are fed to a pair of feed rollers for movement of an individual mailing piece to a bed having a conveyor thereon with mailing piece engaging members for transport of individual mailing pieces at regularly spaced intervals longitudinally of said bed, a power shaft for driving said feed rollers: a mailing head adapted to be driven from said power shaft for applying a severed label to a mailing piece comprising a label applying roller adapted to revolve through one revolution for the movement past said mailing head of each evenly spaced mailing piece, a feed roller having perforation engaging pins extending from the periphery thereof for feeding an intervally perforated strip to said label applying roller along the periphery thereof, suction means for holding said strip to the periphery of said label applying roller, a raised portion on said roller of length substantially equal to the length between perforations of said intervally perforated strip, said raised portion having suction openings in the face thereof for holding a severed label thereto, a shaft driven by said power shaft and in accordance with the speed of movement of said regularly spaced mailing pieces, a journal for said second named shaft, a rotating cutter carried by said second named shaft for severing said intervally perforated strip when said intervally perforated strip has advanced along the periphery of said label applying roller to be held by suction to said raised portion, a paste applying roller for applying paste to said severed label while being held against said raised portion, a frame adapted to be rotated around said journal for supporting said feed roller and said label applying roller in driving engagement with said second named shaft, said frame being adjustable in position according to the thickness of said regularly spaced mailing pieces, means associated with said label applying roller for breaking the suction against said openings in said raised portion when said label applying roller has rotated to a position where said raised portion is in engagement with a mailing piece with a pasted and severed label therebetween, and means for disengaging said feed roller when the interval between said mailing pieces is in excess of a predetermined amount including a sensing finger cooperating with a switch adapted to operate when the interval between said mailing pieces is in excess of a predetermined amount to control the energization of a solenoid for controlling said disengaging means.

19. In a mailing machine of the type wherein mailing pieces are moved at evenly spaced intervals for application thereto of a severed label having intelligence thereon: a mailing head for applying said severed label to a mailing piece comprising a label applying roller adapted to contact each regularly spaced mailing piece with a rolling action for applying a pasted and severed label held by said label applying roller, means for feeding a mailing strip to said label applying roller along the periphery thereof, suction means for holding said strip to the periphery of said label applying roller, a raised portion on said label applying roller of length substantially equal to the length of an intelligence bearing severed label, said raised portion having suction openings in the face thereof for holding a severed label thereto, means for severing said strip when said strip has advanced along the periphery of said label applying roller to be held by suction to said raised portion, means for applying adhesive material to said label while being held against said raised portion, and means associated with said label applying roller for breaking the suction at said openings in said raised portion when said label applying roller has rotated to a position where said raised portion is in engagement with a mailing piece with a pasted and severed label therebetween.

20. In a mailing machine of the type wherein mailing pieces are moved at evenly spaced intervals for application thereto of a severed label having intelligence thereon: a mailing head for applying said severed label to a mailing piece comprising a label applying roller adapted to contact each regularly spaced mailing piece with a rolling action for applying a pasted and severed label held by said label applying roller, means for feeding a mailing strip to said label applying roller along the periphery thereof, suction means for holding said strip to the periphery of said label applying roller, a raised portion on said label applying roller of length substantially equal to the length of an intelligence bearing severed label, said raised portion having suction openings in the face thereof for holding a severed label thereto, means for severing said strip when said strip has advanced along the periphery of said label applying roller to be held by suction to said raised portion, means for applying adhesive material to said label while being held against said raised portion, means associated with said label applying roller for breaking the suction at said openings in said raised portion when said label applying roller has rotated to a position where said raised portion is in engagement with a mailing piece with a pasted and severed label therebetween, and means for stopping said mailing strip feeding means when the interval distance between said mailing pieces is in excess of a predetermined amount.

WAYNE F. RIDENOUR.

REFERENCES CITED

The following references are of record in the file of this patent:

UNITED STATES PATENTS

| Number | Name | Date |
|---|---|---|
| 1,100,790 | Stein | June 23, 1914 |
| 1,660,467 | Anderson | Feb. 28, 1928 |
| 1,949,158 | Gay | Feb. 27, 1934 |
| 2,033,849 | Mudd | Mar. 10, 1936 |
| 2,050,455 | Ohlsen et al. | Aug. 11, 1936 |
| 2,064,658 | Grieb | Dec. 14, 1936 |
| 2,195,111 | Kagley | Mar. 26, 1940 |
| 2,483,458 | Fischer et al. | Oct. 4, 1949 |